United States Patent [19]

Friedrich et al.

[11] 4,361,535

[45] Nov. 30, 1982

[54] CONTROL SYSTEM AND PROCESS FOR THE OPERATION OF NUCLEAR REACTORS

[75] Inventors: Klaus Friedrich, Schwetzingen; Rainer Nicolai, Hassloch; Fritz Schweiger, Hagen; Winfried Wachholz, Heddesheim, all of Fed. Rep. of Germany

[73] Assignees: Hochtemperatur-Reaktorbau GmbH, Cologne; Hochtemperatur-Kernkraftwerk GmbH, Uentrop, both of Fed. Rep. of Germany

[21] Appl. No.: 124,929

[22] Filed: Feb. 26, 1980

Related U.S. Application Data

[63] Continuation of Ser. No. 925,757, Jul. 18, 1978, abandoned, which is a continuation of Ser. No. 644,041, Dec. 24, 1975, abandoned.

[30] Foreign Application Priority Data

Dec. 24, 1974 [DE]  Fed. Rep. of Germany ....... 2461389

[51] Int. Cl.$^3$ .............................................. G21C 7/06
[52] U.S. Cl. ..................... 376/215; 376/217
[58] Field of Search ............ 176/20 R, 22, 24; 376/215, 217

[56] References Cited

U.S. PATENT DOCUMENTS

| | | | |
|---|---|---|---|
| 3,253,994 | 5/1966 | Kagi | 176/20 R |
| 3,255,084 | 6/1966 | Doroszlai | 176/20 R |
| 3,341,422 | 9/1967 | Gilbert | 176/20 R |
| 3,356,577 | 12/1967 | Fishman | 176/20 R |
| 3,625,815 | 12/1971 | Fishman | 176/24 |
| 4,096,030 | 6/1976 | Oberle | 176/20 R |

Primary Examiner—Sal Cangialosi
Attorney, Agent, or Firm—Schwartz, Jeffery, Schwaab, Mack, Blumenthal & Koch

[57] ABSTRACT

Disclosed is a control system and process for operating same for nuclear reactors, particularly gas cooled nuclear reactors, comprising in the control system a means for measuring the output produced in the reactor core and the output removed by a primary circuit or a secondary circuit, a means for integrating the integral of the core produced output over the output level, during the same time, of the primary or secondary circuit of the reactor and a means for forming a control signal from the value of the integral.

13 Claims, 2 Drawing Figures

CONTROL SYSTEM AND PROCESS FOR THE OPERATION OF NUCLEAR REACTORS

This is a continuation of application Ser. No. 925,757, filed July 18, 1978, which in turn is a continuation of Ser. No. 644,041 filed Dec. 24, 1975.

BACKGROUND OF THE INVENTION

1. Field of the Invention

The invention concerns a process for the operation of nuclear reactors, particularly gas-cooled reactors, and a control system for nuclear reactors for carrying out the process.

2. Description of the Prior Art

Nuclear power plants such as gas-cooled nuclear reactors having a reactor core, a turbine, a compressor and a heat exchanger are known in the art. Often these power plants will possess one or more circuits for the transfer of the energy from the nuclear reaction and conversion of such energy to drive turbine generations for example. These circuits may comprise the turbine assembly, gas lines, coolers, recuperators and the like for effective operation of the power plant. Complex arrangements are often necessary to adequately house the reactor core and to carry out its operation under regulated and controlled conditions for the conversion of energy on an economical basis during continued operation of the power plant.

In addition to devices for the regulation and control of the usual operation processes, nuclear reactors are also conventionally equipped with safety system which shut the reactor down when fault conditions arise. In one such system, a rapid shut-down or scram of the reactor takes place first and, if the fault cannot be obviated within a predetermined time interval, a long-term or full shut-down occurs. For the detection and measurement of the fault parameters-essentially neutron flux, reactor period, temperature and pressure-a so-called reactor protection system is often employed. Being a component of the safety system, it consists of instrumentation for the detection of faults, limiting value indicators and control devices. In a conventional process and neutron flux in the core is measured and, when it exceeds a certain threshold value, a rapid shut-down is effected. As an alternative process, it is also known to utilize the measured temperature of the coolant or operational pressures as fault parameters for reactor shut-down.

In order to achieve the greatest possible safety and reliability, the reactor protection system is, as a rule, arranged in a redundant manner, i.e. several identical signals are necessary for bringing about a shut-down. For safety reasons, however, the signals of different fault parameters are not compared with each other: rather, for the initiation of a reactor shut-down it suffices if one fault magnitude gives a signal exceeding the threshold value.

The drawback of this known process and reactor protection system is that the reactor is shut down even in the event of relatively unimportant small faults, e.g. from subordinate control loops, or faulty functioning which cannot lead to any serious impairment of components and which can be eliminated or corrected without particular trouble, or in the event of a strong deflection of the measuring instruments, or in the event of the short-term overshoot of the control parameters. Although the reactor may be started up again directly after the fault or overshoot comes to an end, nevertheless, temperature cycles that are harmful to components of the reactor cannot be avoided.

SUMMARY OF THE INVENTION

The present invention proceeds from the foregoing state of the art and has an object to provide a process and control system which extensively avoids a reactor shut-down in the event of overshoots or fault indications and which limits reactor shut-down essentially to genuine fault conditions.

It is a particular object of the invention to provide a process and control system of the above-mentioned type which utilizes not only the one-dimensional values, such as neutron flux, temperature, pressure and the like but also calculates the two-dimensional values by measuring their magnitude over a period of time to form an improved control signal. In this manner, deviations of the quantity of energy produced in the core from the desired quantity of energy can be detected exactly and very rapidly, which is very important since this difference in the amount of energy is the actual cause of damage to reactor components. In other words, it is not a short-term rise in temperature or pressure that leads to damage to reactor components, but rather a quantity of energy deviating from the desired value and existing for a long term.

It is therefore another object of the present invention to detect these deviations and control the operation of the reactor in response thereto. The process may effect the partial or total shut-down of the reactor or additionally may provide for counter measures to be carried out to remove the fault before initiating the scram process.

In accomplishing these and other objects, there has been provided in accordance with the present invention a process for operating nuclear reactors, particularly gas-cooled nuclear reactors, having a reactor core and a circuit for carrying out a work cycle comprising continuously integrating the integral of the output produced by the reactor core over the simultaneously given level of the output removed in the circuit of the reactor, and by utilizing the predetermined threshold values of the integral as the control values or parameters for controlling the reactor. The circuit may be either a primary or secondary circuit of the reactor, i.e. it may be the main circuit capable of carrying out the work cycle of the reactor such as that comprising the main heat exchangers, turbine assembly, gas lines or the like or it may be a circuit subordinate to the main circuit.

Also provided in accordance with the present invention is a control system for nuclear reactors, particularly gas-cooled nuclear reactors having a reactor core and a circuit for carrying out a work cycle comprising means for measuring the output produced in the core and the output removed by the circuit, means for continuously integrating the integral of the core-produced output over the output level, during the same time, of the circuit of the reactor, and means for forming a control signal from the value of the integrated integral.

The reactor is a conventional nuclear reactor such as the reactors disclosed in U.S. Pat. Nos. 3,371,017, 3,656,566 and 3,748,228 and particularly the gas-cooled nuclear reactors such as the high temperature gas-cooled nuclear reactors. The work cycle circuit of such a reactor comprises one or more turbine asemblies, heat exchangers, coolers and compressors, steam generators and the like. These rectors are well known in the art and conventionally contain various operational system for start-up, shut-down and control of the nuclear reaction in the reactor core.

In practical operation of the reactor, the output produced by the core is integrated over the instantaneous removed output, i.e. continuously the integral $$J = \int_{\tau - \Delta t}^{\tau} [Q_{ERZ}(t) - KQ_{AB}(\tau)] dt$$

is formed, wherein $Q_{ERZ}(t)$ represents the output produced in the core in the time interval $\Delta t$, and $Q_{AB}(\tau)$ is the output level of the removed output present up to the point in time $\tau$, and K is a factor that takes losses and effeciency into consideration. Since the neutron flux in the core is proportional to the core output, it is sufficient to determine the output produced by neutron flux measurements. The output removed can be ascertained from the core output given up at the steam generators, from the output of the steam generators, or also from the output of the turbines. For this, particularly, for the turbine output, losses and corresponding efficiencies must be considered. By making the measurement of the output produced at that location in the reactor where the output arises, by performing the measurement of neutron flux which is the one most rapidly sensible, and by constantly monitoring possible deviations between the output produced and a removed output, a more rapid sensing of the actual amount of energy generated in the core is rendered possible and counter-measures may be introduced in a shorter time. Furthermore, it is ensured that the magnitude of postulated faults that do not cause an increase in energy in the core may be measured more accurately and counter-measures exactly matching the magntidue of the fault may be introduced without shutting the reactor down.

A threshold magnitude of the integral may be specified and that when exceeded, it provides a signal for reactor shut-down. However, it is also possible so to determine the threshold value that, on being exceeded, the reactor is not shut down immediately, but rather actuation of the control and/or regulating devices of the reactor is initiated until the fault is eliminated. Further, a combination of the above threshold values is also possible such that first the control and/or regulating devices are actuated, and when this is insufficient to eliminate the fault and a second threshold value is exceeded, shut-down of the reactor is effected.

Since the integral formed in the event of this postulated short-term faults or overshoots is very small, as a rule, in this case no reactor shut-down ensues. However, the reactor is shut down when the amount of energy given by the integral exceeds the preset threshold value even if the neutron flux is scarcely higher.

For carrying out the process according to the invention, the reactor protection system of the nuclear reactor is provided with measuring devices for measuring the output produced in the core and for measuring the output removed or consumed in the primary circuit, the secondary circuit or a turbine; in addition, a computer is provided for continuously integrating the integral of the core-produced output over the level of output given up in the same time as the primary or secondary circuit of the reactor, and from it forms a control signal. The reactor protection system may be equipped with measuring devices, and signalling or controlling devices that are conventionally well known in the art. Likewise, the computer may be any conventional computer such as the mini-computer well known in the art. Should it be required to provide control before a pure or complete reactor shut-down, special measuring devices, and signalling or controlling devices may be arranged for this purpose.

The proposed process may also be used for reactors that already have a complete shut-down system, including a reactor protection system. The process can then preferably be connected before the scram process as a control or regulating process. In this way, most of the anticipated fault conditions or even low-level fault conditions can be intercepted before shutting the reactor down. Besides, the predetermined threshold values of the already existing shut-down system may be increased so that in this way also excessive or unnecessary shut-downs are avoided.

DESCRIPTION OF THE PREFERRED EMBODIMENTS

The invention is described in detail by way of the following preferred embodiment.

Figure 1:
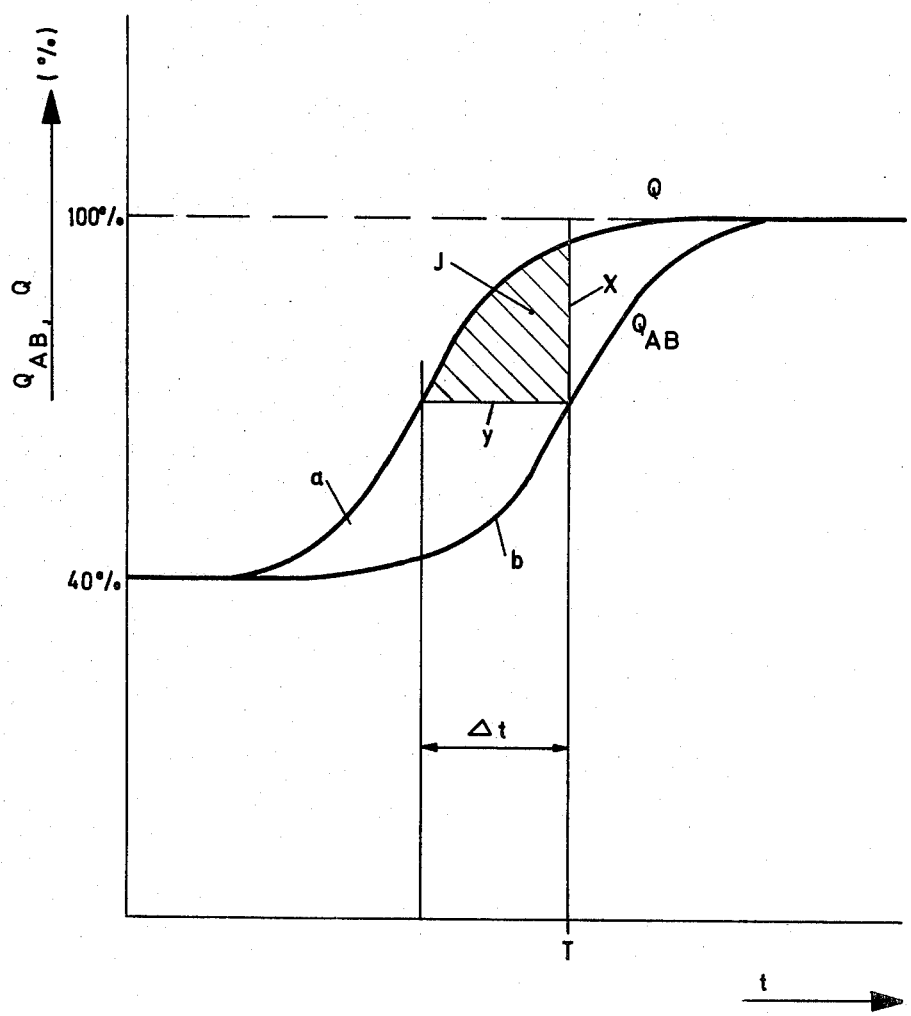
Figure 2:
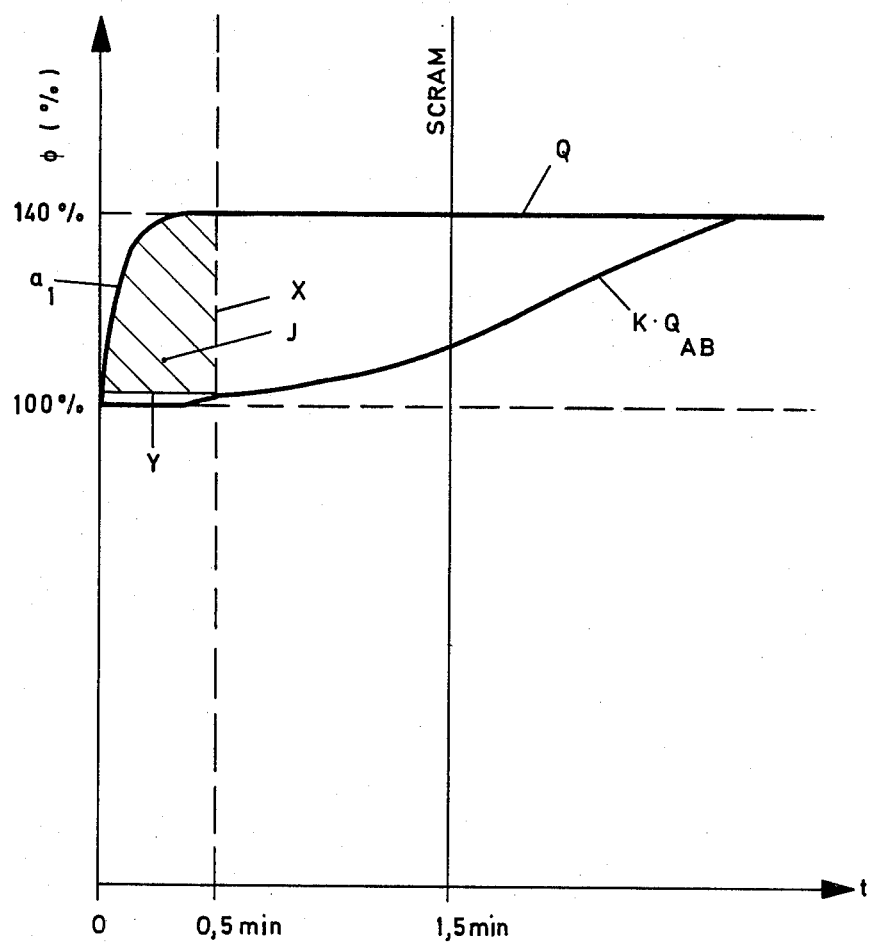

FIG. 1 is a diagram of the produced output and removed output plotted against time, and FIG. 2 illustrates the neutron flux/output over time, in an assumed fault condition from stationary full load.

In FIG. 1 the diagram plots the output Q over the time t. It is assumed that the output is changed from partial load (40%) to full load (100%). By appropriate, known measures the output produced in the core, $Q_{ERZ}$, is raised (curve a). The output removed at the turbine, $KQ_{AB}$, follows with delay (curve b). The output curves lying at the same level differ until a control measure is taken, and the area enclosed by the curves a and b represents the energy required to raise the reactor to the desired output level. In order to avoid an excessively rapid change of the quantity of energy, and possibly a related excessive load of the reactor components, the output difference between $Q_{ERZ}$ and $KQ_{AB}$ must not be too large. The invention is based on this fundamental recognition, as a consequence of which the above-explained integral J is continuously formed, which is the energy enclosed by the curve a, the straight line x representing the point in time, and the straight line y representing the output level $KQ_{AB}$ at that same time. When the integral J exceeds a predetermined value, the appropriate counter-measures are introduced. A considerably larger integral results then, i.e. a considerably larger quantity of energy which in the usual measurements of temperature and pressure in the primary and secondary circuits is not immediately sensed. This output is not sensed by the threshold value indicators of the neutron flux measurement either since the threshold value given by the neutron flux has not yet been exceeded in certain circumstances. The known reactor protection system is so arranged that the amount of energy generated is always detected by temperature and pressure indications and the reactor is shut down, yet this detection is delayed and until the detection significant amounts of energy may be produced already in the core, which are to be removed. By means of the novel process the energy produced in the core is detected significantly earlier, its magnitude is measured and thereby counter-measures may also be introduced significantly earlier. These counter-measures are based preferably on a reversing regulation of the core output without immediate shut-down. Only the fault parameter is compensated, in that for example the core rods are inserted. By inserting the core rods to a certain extent, an exact compensation of the excess energy can be achieved. An immediate shut-down, as with the hitherto known methods, is not necessary, because within the permissible limits the equilibrium of the energy supplied or removed is monitored. The early detection of the magnitude of the fault, and the early introduction of counter-measures which are connected therewith and which are specially designed and matched therefor avoid an overload of the reactor components both by preventing the attainment of permissible maximum values, and by avoiding the anti-cyclic temperature stress loads due to shut-down/cooling and start-up/heating. This finally leads to an increase in the life of the reactor components and to a lower number of repairs, with all the attendant advantages.

When, as a consequence of a fault, the integral from the above-described equation exceeds a certain magnitude, one or more absorber rods are inserted, as a corresponding counter-measure. This magnitude or threshold value of the integral which represents the amount of heat or work produced in the core, is to be dimensioned such that it should be greater than the value of heat changes arising in normal regulating load operation when the power plant is driven from a lower load level to a higher one.

By way of an example, it is assumed in FIG. 2 that in a gas-cooled nuclear reactor of 300 MW the neutron flux threshold values 0 lies at 140% of the normal 0. On the incidence of a fault wherein according to a curve $a_1$ a relatively rapid rise of the neitron flux consequent on the fault to a value barely under 140% is postulated, in this reactor employing the usual safety systems the fault condition is detected only after about 1.5 min. via the threshold value of the hot gas and a corresponding shut-down measure (scram) is initiated. The integral J arising and formed by the novel process, shown shaded, attains a value of about 3000% sec. If the threshold value of the integral J=1000% sec., then a considerably earlier detection of the fault is set so that threshold is achieved, namely already after about 0.5 min., dotted line, and a correspondingly earlier introduction of counter-measures may be affected. Fundamentally, it is possible further to lower the threshold value or limit of the integral and to detect faults even more quickly. Attention must, however, be paid to the fact that for normal regulated load operation there is already a regulated load system present in the reactor, which covers a certain range of faults. For the correction of non-steady processes in this example, a value of 500 sec. maximum is required. An adequate interval should be maintained between the maximum value for the normal regulated load operation and the threshold value for the integral so that the two systems do not impair each other. The counter-measures to be applied in the usual manner include the insertion of absorber rods by a certain amount, which compensates for the change in reactivity arising in the core and the rise in temperature connected therewith. The rods used may be the operational regulating or control rods, but it is also possible certain previously exactly stipulated rods of the safety system may be brought into play. The latter occurs as a counter-measure held in reserve within the framework of the safety system.

What is claimed is:

1. An open-loop control process for operating nuclear reactors having a reactor core and a circuit for carrying out a work cycle, comprising:
    continuously generating over a discrete time interval the integral of the output produced by said reactor core minus the output removed in the same discrete time interval in said circuit of said reactor,
    continuously integrating said integral over said discrete time inteval, and
    utilizing predetermined threshold values of the integral and the determined integral values as parameters for shutdown of said reactor.

2. The process according to claim 1 wherein said integral is formed according to the formula:

$$J = \int_{\tau - \Delta t}^{\tau} [Q_{ERZ}(t) - KQ_{AB}(\tau)] dt$$

wherein $Q_{ERZ}(t)$ is said output produced in said reactor core in the time interval $\Delta t$ and $Q_{AB}(\tau)$ is the output level of said removed output present up to time $\tau$, and K is a factor taking losses and efficiency into account.

3. A process according to claim 2 wherein said output produced by the core is ascertained by neutron flux measurements.

4. A process according to claim 2 wherein said removed output is determined by measurements of the output given up from said core at steam generators arranged in said circuit.

5. A process according to claim 2 wherein said removed output is determined by measurements of the output of steam generators arranged in said circuit.

6. A process according to claim 2 wherein said removed output is determined by measurements of the output of a turbine arranged in said circuit.

7. An open-loop shutdown system for nuclear reactors having a reactor core and a circuit for carrying out a work cycle comprising:
    means for measuring the output produced in said core and
    means for measuring the output removed by said circuit,
    means for generating the integral over a discrete time interval of said core-produced output less said output removed, from said circuit of said reactor and means for continuously integrating said integral over a discrete time interval and means for forming a shutdown signal where the value of said integrated integral exceeds a predetermined value.

8. The control system according to claim 7 comprising, in addition to said measuring means and said integral generating means, means for normal operational regulating and control of the reactor.

9. The control system according to claim 7 wherein said circuit comprises a primary circuit and a secondary circuit.

10. The control system according to claim 9 wherein said measuring means measures said output removed from said primary circuit.

11. The control system according to claim 9 wherein said measuring means measures said output removed from said secondary circuit.

12. The control system according to claim 7 wherein the nuclear reactor is a gas-cooled nuclear reactor.

13. The process according to claim 1 wherein the nuclear reactor is a gas-cooled nuclear reactor.

* * * * *